United States Patent Office 3,594,413
Patented July 20, 1971

---

3,594,413
CYCLOPENTENE DERIVATIVES
Harvey E. Alburn, West Chester, and Horace Fletcher III,
Pottstown, Pa., assignors to American Home Products
Corporation, New York, N.Y.
No Drawing. Filed Nov. 20, 1968, Ser. No. 777,506
Int. Cl. C07c *101/14*
U.S. Cl. 260—514          2 Claims

ABSTRACT OF THE DISCLOSURE

This invention is concerned with the preparation of cyclopentene - 1,1 - dicarboxamides; 1,3-diazaspiro[4,4] nonene-2,4 - diones; 1 - aminocyclopentene-1-carboxylic acids; 1-(N - alkylamino)cyclopentene - 1 - carboxylic acids; and 3-oxa-1-azaspiro[4,4] nonene-2,4-diones which are intermediates in the preparation of 6-(1-aminocyclopentene-1-carboxamido)penicillanic acids which are useful antibacterial agents.

---

The present invention relates to new and novel cyclopentene derivatives. In particular, it is concerned with cyclopentene-1,1-dicarboxamides;
1,3-diazaspiro[4,4] nonene-2,4-diones;
1-aminocyclopentene-1-carboxylic acids;
1-(N-alkylamino)cyclopentene-1-carboxylic acids; and
3-oxa-1-azaspiro[4,4] nonene-2,4-diones which are useful intermediates in the synthesis of 6-(1-aminocyclopentene-1-carboxamido)penicillanic acids.

The new and novel compounds within the purview of the present invention are represented by the following formulae:

wherein $R_1$ is selected from the group consisting of carboxy and amido; $R_2$ is selected from the group consisting of amino, lower alkylamino, phen(lower)alkylamino and amido with the proviso that when $R_1$ is amido $R_2$ is also amido; and when $R_1$ and $R_2$ are taken together with the carbon atom to which they are attached they form a ring selected from the group consisting of 1,3-diazolidin-5-yl-2,4-dione, 3-oxa-1-azolidin-5-yl-2,4-dione, 1-(lower) alkyl-3-oxa-1-azolidin-5-yl-2,4-dione, and 3-oxa - 1 - phen-(lower)alkyl-1-azolidin-5-yl-2,4-dione. Typical examples thereof are: 3-cyclopentene-1,1-dicarboxamide; 1,3-diazaspiro[4,4] non-7-ene-2,4-dione; 1-amino-3-cyclopentene-1-carboxylic acid; and 3-oxa-1-azaspiro[4,4] non-7-ene-2,4-dione.

The new and novel compounds of the present invention are prepared by the process which is hereinafter schematically depicted as follows:

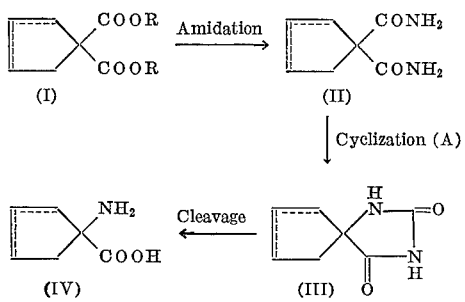

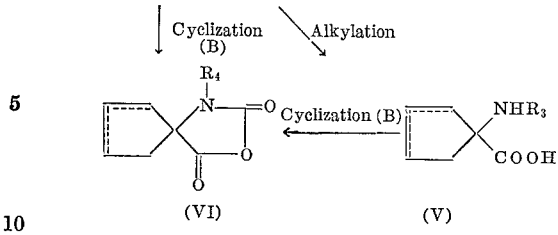

wherein the broken line indicates the presence of a double bond in one of the two designated positions; $R_3$ is selected from the group consisting of lower alkyl and phen(lower)alkyl; and $R_4$ is selected from the group consisting of hydrogen, lower alkyl and phen(lower)alkyl. The amidation reaction is effected by contacting a dialkyl cyclopentene-1,1-dicarboxylate (I) with an alkanol saturated with ammonia containing an alkali metal alkoxide for about seventy hours at ambient temperatures. Subsequently, the reaction mixture is admixed with an alkali metal e.g. sodium or potassium in anhydrous alkanol for about an additional forty-eight hours. Preferably this reaction is conducted using ammonia saturated methanol containing sodium methoxide and then sodium in anhydrous methanol. When the amidation reaction is complete the resulting cyclopentene-1,1-dicarboxamide (II) is recovered by standard procedures. For example, the insoluble product (II) is filtered, washed with an appropriate solvent e.g. methanol, and then dried.

The cyclization (A) reaction is effected by contacting an above-prepared cyclopentene-1,1-dicarboxamide (II) with an aqueous solution of an alkali metal hypohalite at about freezing temperatures and then allowing the resulting solution to warm to ambient temperatures. Preferably this reaction is conducted using an aqueous solution of sodium hypobromite. When the cyclization (A) reaction is complete, the resulting 1,3-diazaspiro[4,4] nonene-2,4-dione (III) is recovered by conventional methods e.g. the reaction mixture is acidified with a mineral acid, evaporated to dryness, the residue extracted with an appropriate solvent, such as, hot ethyl acetate, filtered and the filtrate evaporated to dryness.

The cleavage reaction is effected by contacting an above-prepared 1,3-diazaspiro[4,4] nonene-2,4-dione (III) with barium hydroxide in water in an autoclave at about 200° C. for a period of about twenty hours. Thereafter, the reaction mixture is dissolved in a dilute mineral acid and admixed with sulfuric acid. When the reaction is complete, the resulting 1-aminocyclopentene-1-carboxylic acid (IV) is separated by routine recovery procedures. For example, the reaction mixture is filtered, the filtrate evaporated to dryness, the residue extracted with hot methanol, the extract evaporated and reconstituted with water, the resulting solution passed through a column of a strong acid resin in the hydrogen cycle, the column washed with water and eluted with ammonium hydroxide, the effluent is evaporated to dryness and the product (IV) crystallized from an appropriate solvent e.g. methanol-ethanol.

The alkylation reaction is effected by contacting an above-prepared 1-aminocyclopentene-1-carboxylic acid (IV) in an aqueous solution of an alkali metal hydroxide with a p-toluenesulfonyl halide, e.g. chloride in a water-immiscible organic solvent, such as, ether, hexane or benzene at about ambient temperatures for a period of about sixteen hours. The water-immiscible organic layer is then discarded, and the aqueous phase acidified with a mineral acid e.g. hydrochloric acid, the resulting precipitate is separated, washed and dried to give a 1-toluene-p-sulfonamidocyclopentenecarboxylic acid.

The above-prepared sulfonamide, an alkyl halide, such as, methyl iodide and an aqueous solution of an alkali metal hydroxide e.g. sodium hydroxide are heated at about 100° C. for a period of about three hours. Thereafter, the reaction mixture is cooled, filtered, and the filtrate acidified with a mineral acid to afford an appropriate 1 - N-alkyl-toluene-p-sulfonamidocyclopentene carboxylic acid.

This N-alkylsulfonamide is heated in concentrated hydrochloric acid in sealed glass tubes at about 150° C. for a period of about ten hours. When the reaction is complete, the resulting 1-(N-alkylamino)-cyclopentene-1 carboxylic acid (V) is recovered by standard procedures. For example, the reaction mixture is evaporated to dryness, the residue dissolved in water, the solution passed through a column of a strong basic resin in the base cycle, then the effluent is evaporated and the residue crystallized from a suitable solvent e.g. ethanol to afford the product (V).

The cyclization (B) reaction is effected by contacting either a 1-aminocyclopentene-1-carboxylic acid (IV) or a 1-(N-alkylamino)-cyclopentene-1-carboxylic acid (V) with phosgene in a reaction-inert organic solvent e.g. dioxane, benzene or tetrahydrofuran at a temperature range of about 70° C. to about 80° C. for a period of up to about two hours. When the cyclization (B) reaction is complete, the resulting 3-oxa-1-azaspiro[4,4] nonene-2,4-dione (VI) is separated by conventional procedures. For example, the reaction mixture is flushed with an inert gas, such as, nitrogen, the solvent evaporated, the residue dissolved in a suitable solvent e.g. ethyl acetate and then crystallized from an appropriate liquid, such as, hexane.

The dialkyl cyclopentene-1,1-dicarboxylate (I) starting materials are prepared by the procedure described by G. Schmid and A. Wolkoff in J. Org. Chem. 32, 254 (1966). The other materials employed in the herein described reactions are commercially available or are easily prepared by procedures which are well known in the chemical art.

The new and novel cyclopentene-1,1-dicarboxamides (II); 1,3 - diazospiro[4,4] nonene - 2,4-diones (III), 1-aminocyclopentene-1-carboxylic acids (IV); 1-(N-alkylamino)cyclopentene-1-carboxylic acids (V); and 3-oxa-1-azaspiro[4,4] nonene-2,4-diones (VI) are valuable intermediates in the preparation of biologically active 6-(1-aminocyclopentene - 1 - carboxamido)penicillanic acids which are described and claimed in copending United States Ser. No. 777,482, entitled "6-(1-Aminocyclopentene 1-Carboxamido)Penicillanic Acids and Derivatives Thereof," by Harvey E. Alburn and Norman H. Grant which was filed in the United States Patent Office on the same day as the subject application, and identified by attorney docket number AHP-4941. These 6-(1-aminocyclopentene-1-carboxamido)penicillanic acids in standard and accepted biological tests have exhibited activity against gram-positive and gram-negative bacteria. In this regard, these penicillin compounds are, therefore, of value as antibacterial agents, nutritional supplements in animal feed; agents for the treatment of mastitis in cattle; and as therapeutical agents in poultry and mammals, in the treatment of infectious diseases caused by gram-positive and gram-negative bacteria, upon either parenteral or oral administration. Further, when employed as such these penicillins are significantly less toxic to the recipient host than related prior art compounds.

As previously indicated, when the penicillins which are prepared from the intermediates of this invention are employed in mammals, e.g. mice, rats, dogs, monkeys and the like, they may be administered orally or parenterally. Naturally, the dosage of these compounds will vary somewhat with the form of administration and the particular compound chosen. Furthermore, it will vary with the particular subject under treatment. In general, these penicillin compounds which are prepared from the intermediates of this invention are most desirably administered at a concentration level that is in the range of from about 10 to about 400 mg. per kilo per day, although as aforementioned variations will occur. However, this dosage range will generally afford effective results without causing any harmful or deleterious side effects.

The following examples are given by way of illustration and are not to be construed as limitations of this invention, many variations of which are possible without departing from the scope and spirit thereof.

EXAMPLE I

Diethyl 3-cyclopentene-1,1-dicarboxylate, prepared by the method of G. Schmid and A. Wolkoff J. Org. C. 254, 32 (1966) (223.5 g., 1.06 moles) is stirred in 4 liters of ammonia saturated methanol containing sodium methoxide for seventy-two hours at room temperature. After this time a solution of 6 g. of sodium in 200 ml. of dry methanol is added and the reaction allowed to stand for forty-eight hours. The insoluble 3-cyclopentene-1,1-dicarboxamide is filtered, washed with cold methanol and dried, (yield 77 g., 47%), M.P. 222–4° C.

The filtrate is diluted with one liter of methanol containing 15 g. of sodium and the solution is resaturated with ammonia and allowed to stand overnight. The clear solution is then evaporated in vacuo to one liter on a rotary evaporator and filtered to afford additional product, (yield 31 g., 20%), M.P. 222–223° C., for a total yield of 108 g.

*Analysis.*—Calc'd for $C_7H_{10}N_2O_2$: N=18.17%. Found: N=18.38%.

In a similar manner, diethyl-2-cyclopentene-1,1-dicarboxylate is converted to 2-cyclopentene-1,1-dicarboxamide.

EXAMPLE II 3-cyclopentene-1,1-dicarboxamide (44.4 g., 0.29 mole), as prepared in Example I, is added to a solution of sodium hypobromite (made from sodium hydroxide 35 g., 0.88 mole and bromine 46.5 g., 0.29 mole in 40 ml. of water) at 0° C. in an ice-salt bath. The diamide dissolves and the solution is allowed to warm to room temperature overnight. The clear solution gives a negative reaction with starch-iodide paper but as a precautionary measure 7 g. of ammonium bicarbonate are added and the solution is warmed to 50° C. on a steam bath before acidifying to pH 2 with 12 N hydrochloric acid. The acidified solution is evaporated to dryness, the residue extracted with 500 ml. of hot acetone and then filtered. The filtrate is evaporated to dryness in vacuo and the crude product twice crystallized from 400 ml. of hot water to afford 1,3-diazaspiro[4,4] non-7-ene-2,4-dione, total yield 25.6 g. (53.4%), M.P. 190–193° C.

*Analysis.*—Calc'd for $C_7H_8N_2O_2$ (percent): C, 55.24; H, 5.30; N, 18.41. Found (percent): C, 54.85; H, 5.09; N, 18.61.

Similarly 2-cyclopentene-1,1-dicarboxamide is cyclized to afford 1,3-diazaspiro[4,4] non-6-ene-2,4-dione.

EXAMPLE III 1,3-diazaspiro[4,4] non-7-ene-2,4-dione (16.6 g., 0.11 mole), as prepared in Example II, barium hydroxide octahydrate 85 g., 0.27 mole, and 100 ml. of water are heated in a steel autoclave at 200° C. for twenty hours. The mixture is dissolved in dilute hydrochloric acid and 36 N sulfuric acid 15 ml. is then added with stirring. The precipitate is filtered and the filtrate evaporated to dryness in vacuo. The residue is extracted with hot methanol to remove sodium chloride and the methanolic solution containing the product and ammonium chloride is evaporated to dryness. The residue is dissolved in water and passed through a strong acid resin in the hydrogen cycle. After washing with water, the column is eluted with one liter of 2 N ammonium hydroxide. The effluent is evaporated to dryness and the product crystallized from methanol-ethanol to afford 1-amino-3-cyclopentene-1-carboxylic acid (yield 6 g., 40%), M.P. 295–300° C. (dec.).

*Analysis.*—Calc'd for $C_6H_9NO_2$ (percent): C, 56.55; H, 7–13; N, 11.01. Found (percent): C, 56.71; H, 7–04; N, 10.94.

In like manner, 1,3-diazaspiro[4,4] non-6-ene-2,4-dione is converted to 1-amino-2-cyclopentene-1-carboxylic acid.

EXAMPLE IV 3-cyclopentene-1-aminocarboxylic acid (13.1 g., 0.1 mole) is dissolved in 200 ml. of 1 N sodium hydroxide and admixed with 20 g. of p-toluenesulfonyl chloride in 100 ml. of ether. The resulting mixture is stirred overnight at room temperature. The ether layer is separated and discarded while the aqueous phase is acidified with dilute hydrochloric acid. The product crystallizes and is filtered, washed and dried to give 1-toluene-p-sulfonamido-3-cyclopentenecarboxylic acid.

4.2 g., 0.02 mole of this sulfonamide, 5 ml., 0.08 mole of methyl iodide, and 50 ml. of 2 N sodium hydroxide are heated at 100° C. for three hours. Thereafter, the reaction is cooled, filtered and the filtrate acidified with dilute hydrochloric acid to precipitate 1-N-methyl-toluene-p-sulfonamido-3-cyclopentene carboxylic acid.

The above-prepared N-methyl sulfonamide (17 g., 0.055 mole) is heated in 180 ml. of 12 N hydrochloric acid in sealed glass tubes at 140° C. for eight hours. After cooling, the clear solution is evaporated to dryness under vacuum, the residue dissolved in 300 ml. of water and passed through a column of a strong basic resin in the base cycle, the effluent is evaporated and the residue recrystallized from ethanol to yield 1-methylamino-3-cyclopentene-1-carboxylic acid.

In like manner, repeating the above procedure with appropriate starting materials, the following compounds are prepared:

1-(N-benzylamino)-2-cyclopentene-1-carboxylic acid;
1-(N-ethylamino)-3-cyclopentene-1-carboxylic acid;
1-(N-butylamino)-2-cyclopentene-1-carboxylic acid;
1-(N-[2-phenethyl]amino)-3-cyclopentene-1-carboxylic acid; and
1-(N-[3-phenpropyl]amino)-2-cyclopentene-1-carboxylic acid.

EXAMPLE V 1-amino-3-cyclopentene-1-carboxylic acid (4.4 g., 0.0346 mole), as prepared in Example IV, is stirred in 100 ml. of dioxane at 70–80° C. while phosgene is bubbled in for three hours. Thereafter, the reaction is flushed with dry nitrogen for one and one-half hours and the dioxane removed in vacuo. The residual oil is dissolved in ethyl acetate and crystallized with hexane to afford 3-oxa-1-azaspiro[4,4] non-7-ene-2,4-dione (yield 4.1 g., 77%), M.P. 133–5° C.

*Analysis.*—Calc'd for $C_7H_7NO_3$ (percent): C, 54.91; H, 4.61; N, 9.15. Found (percent): C, 54.81; H, 3.66; N, 9.32.

Repeating the above procedure, starting with an appropriate 1-aminocyclopentene-1-carboxylic acid, there is obtained:

3-oxa-1-azaspiro[4,4] non-6-ene-2,4-dione;
1-benzyl-3-oxa-1-azaspiro[4,4] non-6-ene-2,4-dione;
1-ethyl-3-oxa-1-azaspiro[4,4] non-7-ene-2,4-dione;
1-butyl-3-oxa-1-azaspiro[4,4] non-6-ene-2,4-dione;
1-(2-phenethyl)-3-oxa-1-azaspiro[4,4] non-7-ene-2,4-dione; and
1-(3-phenpropyl)-3-oxa-1-azaspiro[4,4] non-6-ene-2,4-dione.

What is claimed is:

1. A compound selected from the group consisting of those having the formulae:

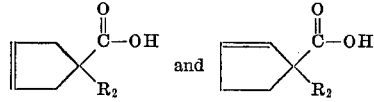

wherein $R_2$ is selected from the group consisting of amino, lower alkylamino and phen(lower)alkylamino.

2. A compound, as defined in claim 1, which is: 1-amino-3-cyclopentenene-1-carboxylic acid.

No references cited.

LORRAINE A. WEINBERGER, Primary Examiner

R. GERSTL, Assistant Examiner

U.S. Cl. X.R.

260—239.1, 307, 309.5, 518, 557